No. 613,048. Patented Oct. 25, 1898.
H. SMITH, Jr.
FILTER.
(Application filed Feb. 11, 1898.)
(No Model.)
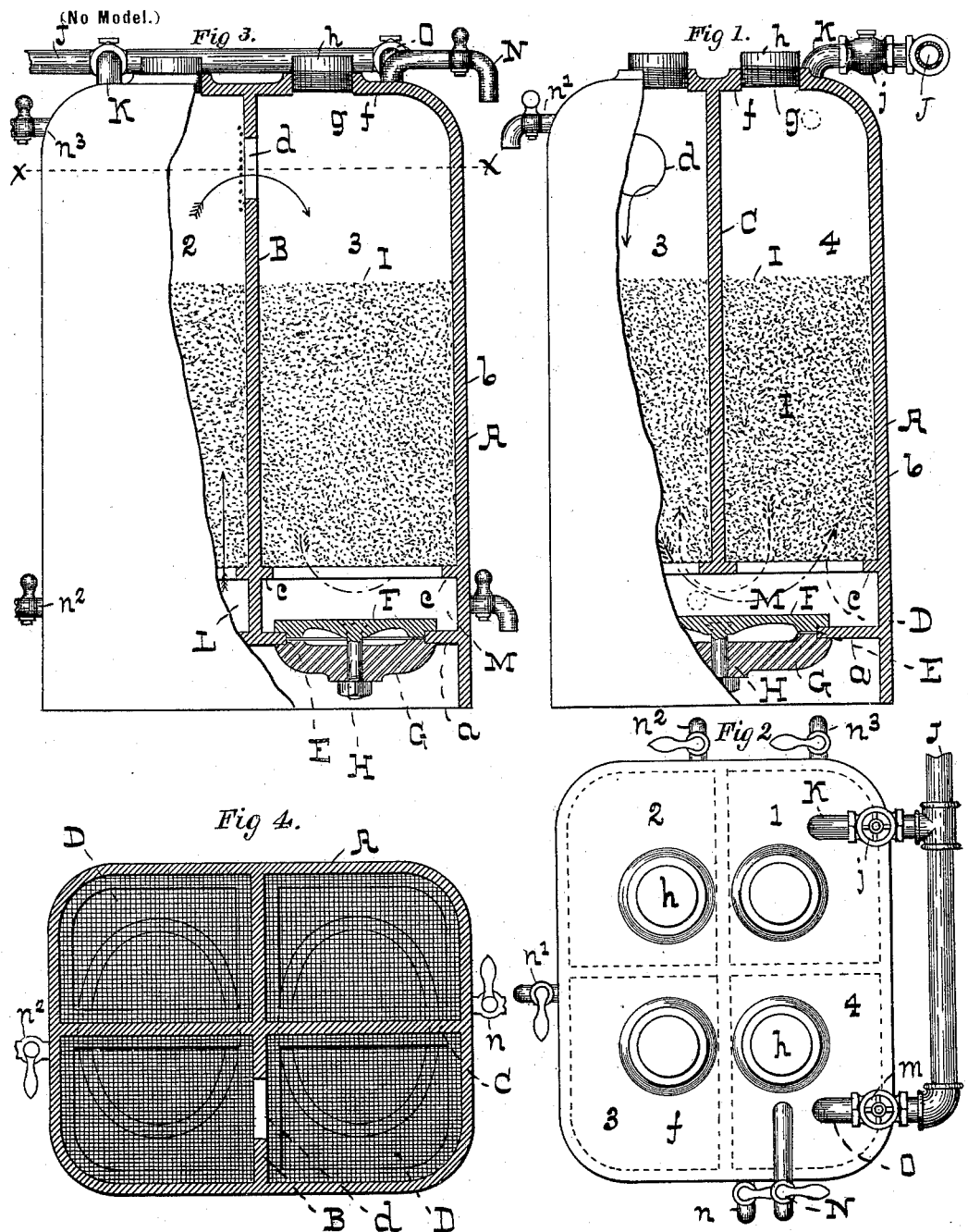

UNITED STATES PATENT OFFICE.

HENRY SMITH, JR., OF BALTIMORE, MARYLAND.

FILTER.

SPECIFICATION forming part of Letters Patent No. 613,048, dated October 25, 1898.

Application filed February 11, 1898. Serial No. 669,911. (No model.)

*To all whom it may concern:*

Be it known that I, HENRY SMITH, Jr., of the city of Baltimore, in the State of Maryland, have invented certain Improvements in Filters, of which the following is a specification.

This invention relates to certain improvements in filters which are cleansed by reversing the current of water through them, as will hereinafter fully appear.

In the description of the said invention which follows reference is made to the accompanying drawings, forming a part thereof, and in which—

Figure 1 is a front elevation of the improved filter with a portion thereof torn away to show the interior. Fig. 2 is a top view of Fig. 1. Fig. 3 is a side elevation with a portion thereof torn away. Fig. 4 is a section of Fig. 3, taken on the dotted line $x$ $x$.

Referring now to the drawings, A is the shell of the filter, the bottom $a$ of which is elevated somewhat above the lower edge of the surrounding wall $b$.

B is a vertical partition extending from the bottom $a$ to the top of the shell, and C a similar partition, which occupies a position at a right angle with the first, but which does not extend to the bottom $a$, but stops a short distance above it. From the partitions B and C, at the point where the latter end, and the wall $b$ extend flanges $c$, which support the gratings or perforated plates D.

From the above description it will be understood that the filter above the flanges $c$ is divided into four compartments and below the said flanges into two compartments, and these latter compartments have hand-holes E, provided with closing-plates F, secured in place by guards G and bolts H with suitable nuts.

These hand-holes are for the purpose of inserting in place the gratings D.

The compartments above the gratings are provided with filtering material, (denoted by I,) and above this filtering material the partition B has a screen-covered hole $d$, which places two of the four compartments in communication.

The top $f$ of the filter has four threaded holes $g$, one leading into each compartment, and these holes have screw-plugs $h$ or other suitable devices, whereby they are tightly closed. These holes $g$ are for the purpose of inserting the filtering material.

J represents the service water-pipe, and K a branch pipe having a cock $j$ therein, whereby water to be filtered is introduced into the upper part of the first compartments, which is denoted by 1. The water thus introduced passes down the compartment 1 through the filtering material and the grating below it into the lower compartment L, through which it passes horizontally, as shown by the dotted arrow in Fig. 1, to under the grating below compartment 2, through the filtering material, in which it ascends, as indicated by the straight arrow in full lines in Fig. 3. The water rising through the filtering material as described then passes through the communicating hole $d$, as shown by the curved full arrow in Figs. 3 and 1 to compartment 3 and passes down through the filtering material therein to the lower compartment M, when it again moves horizontally to beneath the grating at the bottom of the compartment 4, as shown by the curved broken arrow in Figs. 3 and 1. The water then rises through the filtering material in compartment 4 to the space above it in a filtered condition and may be drawn off through the cock N, situated near to or at the top of the compartment.

From the above it will be seen that the water is filtered four times, and the filtering material may be graded in fineness, so as to make the filtering operation gradual.

To cleanse the filter, the current of water is reversed, so that the deposit of mud which rests against the surface of the filtering material through which the water passes is washed off. To effect this result, the service-pipe has a branch O, provided with a cock $m$, which enters the top of the compartment 4, and each compartment has a cock, which in each case is situated at the end of the compartment at which the mud collects. The said cocks are represented, respectively, by $n$, $n'$, $n^2$, and $n^3$. In the cleansing operation the cock $j$ is closed and the cock $m$ opened. The cock $n$ in this compartment is then opened and the mud which has deposited on the bottom of the body of filtering material is washed off and carried away. As soon as the water runs clear the cock $n$ is closed and the one $n'$ opened, which allows the mud deposited on the upper surface of the filtering material in that compartment to be washed away. The other two compartments are then cleansed in a similar manner, after which the cock $m$ is closed and the one $j$ again opened, when the filtering operation will continue as before described.

I claim as my invention—

A filter having its shell divided by a vertical partition into two compartments and subdivided by a cross-partition which extends from near its bottom to the top, whereby the filter at the bottom is divided into two, and at the top into four, compartments, the main partition having a hole situated above the filtering material which places two of the four compartments into communication, combined with gratings to support the filtering material, and suitable cocks to admit of the entrance to and discharge of water from the filter, substantially as specified.

HENRY SMITH, JR.

Witnesses:
WM. T. HOWARD,
DANL. FISHER.